F. C. SCHOENTHAL.
CUT-OUT VALVE FOR HYDROCARBON ENGINES.
APPLICATION FILED SEPT. 10, 1908.
1,119,322.
Patented Dec. 1, 1914.
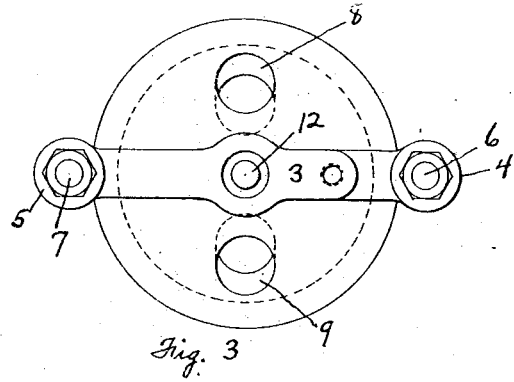
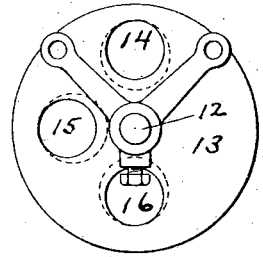
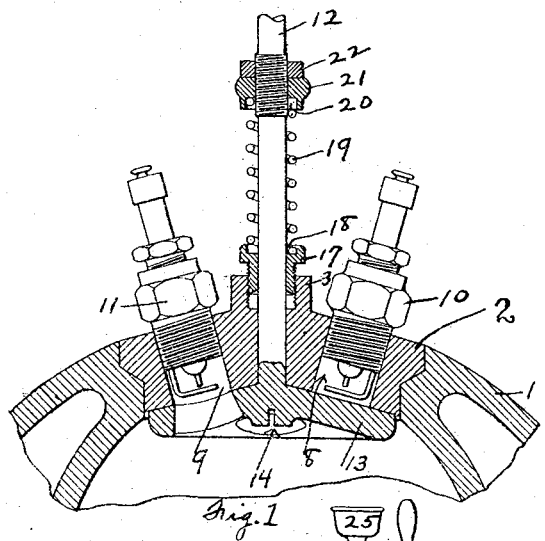
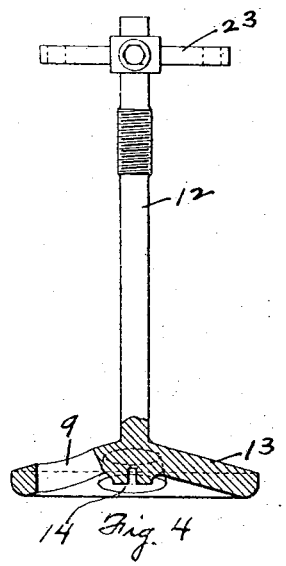
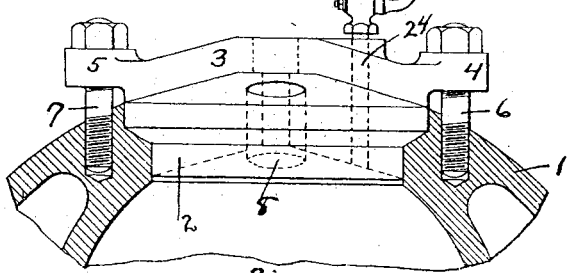
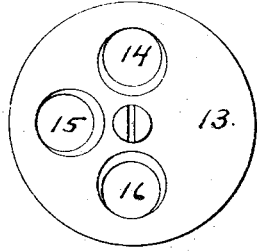

UNITED STATES PATENT OFFICE.

FRED C. SCHOENTHAL, OF BUFFALO, NEW YORK.

CUT-OUT VALVE FOR HYDROCARBON-ENGINES.

1,119,322.   Specification of Letters Patent.   Patented Dec. 1, 1914.

Application filed September 10, 1908. Serial No. 452,468.

*To all whom it may concern:*

Be it known that I, FRED C. SCHOENTHAL, of the city of Buffalo, county of Erie, and State of New York, have invented a certain new and useful Cut-Out Valve for Hydrocarbon-Engines, of which the following is a full, clear, and exact description.

My invention relates to a device to be used in connection with two or more electrodes, spark plugs or other ignition devices and its chief object is to provide a means for keeping such electrodes, spark plugs or other igniting devices when any one of them is not in use clean from all soot, carbon deposits and oil, and also means for protecting the insulations from the action of the compressed gases. The numerous advantages besides the above, resulting from the use of my invention will be clear to those skilled in the art from the following description.

Referring to the drawings: Figure 1 is a sectional view of my device fitted into the cylinder of a hydrocarbon engine. Fig. 2 is an end elevation of my device. Fig. 3 is a top plan view of Fig. 2. Fig. 4 is an elevation partly in section of the valve and valve stem. Fig. 5 is a top plan view of my valve. Fig. 6 is a bottom view of the valve.

In the drawings 1 represents the cylinder of a hydrocarbon engine and 2 is a plug which as shown in Figs. 1 and 2 has a ground joint or gasket seat so that it fits securely into the cylinder of the engine. It will be clear that this plug may or may not be an integral part of the cylinder of the engine as desired. Preferably I make such plug a separate piece from the cylinder and when so made as clearly shown in Figs. 2 and 3 it carries integral with it a strap 3 having lugs 4 and 5 overhanging a part of the engine cylinder. Through these lugs are suitably passed bolts 6 and 7 which are screwthreaded to the cylinder.

The plug 2 is provided with two or more screw-threaded ignition port-holes 8 and 9 into which spark plugs 10 and 11 may be securely threaded. In the drawings I have shown two such port-holes thus providing for a double ignition system but it will be clear that any desired number of such port-holes may be provided depending on the number of ignition systems desired to be used with the engine. The plug 2 is also provided with a valve stem hole through which the valve stem 12 is adapted to pass. Suitably secured to the valve stem 12 or made integrally part thereof, is a valve base 13 which as applied to the double ignition system shown in the drawings is provided with three ports 14, 15 and 16 as shown in Fig. 6. A suitable packing 17 is provided for preventing a leak of gas past the valve stem and this packing at 18 provides a seat for the spring 19. An opposite seat 20 for this spring is provided by means of a nut 21 which is screw-threaded as shown in Fig. 1 to the valve stem. The nut 21 may be adjusted up and down on the valve stem as desired and locked in position by means of the lock nut 22. Of course the tendency of the spring 19 is to draw upwardly the valve stem 12 and thus hold the valve base 13 upward securely against the plug 2 and thus prevent the compressed gases, soot, oil or other dirt from reaching either one or both of the port-holes 8 and 9 if they are covered by the said valve base. In Figs. 5 and 6 where the valve base 13 is clearly shown I have shown openings 14, 15 and 16 one or two of which when the valve stem is suitably turned by means of the valve handle 23 will register with the port-holes 8 and 9 in the plug 2. Also when suitably turned the valve base 13 will close either the port-hole 8 or the port-hole 9 as desired thus protecting it from any accumulating deposits. The plug 2 may be provided as shown in Fig. 2 with an opening 24 into which a priming cup 25 may be inserted. The purpose of this priming cup being to provide ingress into the explosive chamber of suitable quantities of gasolene to assist in starting the engine when it has difficulty in drawing its first fuel supply from the carbureter.

Many hyrocarbon engines use two or more ignition systems usually one being used as the regular system and the other for emergency purposes. In some cases, however, more than two ignition systems are employed and of course when so employed my invention is adapted for allowing the use of either of the systems employed or only one of them at any one time. It will be seen that the valve base 13 may be rotated so that it will tightly close either one of the port-holes 8 or 9 and thus when only one of the spark plugs 10 and 11 is used the other may be entirely protected from any accumulating deposits and thus the spark plug be kept clean and prevented from deterioration. Obviously the holes 14, 15 and 16 may be relatively located in any desired way so that either one of the port-holes 8 or 9 may be closed or if more port-holes are employed and more spark plugs used, then any one of the port-holes in the plug 2 may be kept closed to the interior of the explosive chamber of the engine as desired.

It will be clear that various modifications in the shape and general conformations of my device may be employed without departing from the spirit of the invention or the advantages secured by it. Thus as already stated the plug 2 may be made integral with or separate from the engine cylinder. The strap 3 may be employed as shown or some other means for keeping the plug 2 in proper relation with the cylinder may be employed with as advantageous results as attained by the use of the strap as shown. It will be likewise understood that the valve base 13 although shown as circular in its interior surface may be equally advantageous when made as a tubular, flat or sliding valve base. Any form of valve base which will tightly close as desired one or more of the spark plug port-holes and keep it closed, or open it when desired, will obviously attain most of the advantages attained by means of the specific construction herein shown.

Of course it is understood that my invention is not limited to the precise construction set forth but includes within its purview such changes as may be made within the limits of the appended claims.

What I claim is:

1. In a hydrocarbon engine, the combination with a cylinder, provided with ignition port holes arranged in any desired manner and extending directly into said cylinder and spark plugs fitted into said port holes; of a cut-out valve rotatably mounted in said cylinder, comprising a valve stem and a valve base disposed within said cylinder and governing all of said ignition port holes, said valve base being provided with openings so placed that one or more of said openings may be registered with a corresponding number of said port holes or any one of said port holes may be shut off from said cylinder thus cutting off the explosive mixture from the spark plug fitted therein and protecting the same from the accumulation of soot and also allowing its removal if desired.

2. In a hydrocarbon engine, the combination with a cylinder, provided with ignition port holes arranged in any desired manner and extending directly into said cylinder and spark plugs fitted into said port holes; of a cut-out valve rotatably mounted in said cylinder, comprising a valve stem and a valve base disposed within said cylinder and governing all of said ignition port holes, and means for rotating said valve base, said valve base being provided with openings so placed that any one of said port holes may be shut off from said cylinder thus cutting off the explosive mixtures from the spark plug fitted therein and protecting the same from the accumulation of soot and also allowing its removal if desired.

3. In a hydrocarbon engine, the combination with its cylinder; of a plug set in substantially flush with the inside of said cylinder and provided with ignition port holes arranged in any desired manner and which converge inwardly toward each other, spark plugs adapted to fit in said port holes, and a cut-out valve rotatably mounted in said plug, comprising a valve stem and a valve base governing all of said port holes and provided with openings so placed that one or more of said openings may be registered with a corresponding number of said port holes or any one of said port holes may be shut off from said cylinder thus cutting off the explosive mixture from the spark plug fitted therein and protecting the same from the accumulation of soot and also allowing its removal if desired.

4. In a hydrocarbon engine, the combination with its cylinder; of a plug set in substantially flush with the inside of said cylinder and provided with ignition port holes arranged in any desired manner and which converge inwardly toward each other, spark plugs adapted to fit in said port holes, and a cut-out valve rotatably mounted in said plug, comprising a valve stem and a valve base governing all of said port holes, flexible means for holding said valve base tightly against the inner surface of said plug, and means adjustably secured to said valve stem, said valve base being provided with openings so placed that one or more of said openings may be registered with a corresponding number of said port holes or any one of said port holes may be shut off from said cylinder thus cutting off the explosive mixture from the spark plug fitted therein and protecting the same from the accumulation of soot and also allowing its removal if desired.

In testimony whereof I have hereunto set my hand in the presence of two witnesses.

FRED C. SCHOENTHAL.

Witnesses:
J. Wm. Ellis,
E. A. Kelly.

Copies of this patent may be obtained for five cents each, by addressing the "Commissioner of Patents, Washington, D. C."